March 15, 1927.  
V. P. WHISLER  
JOINTER HEAD  
Filed June 30, 1926
1,620,847
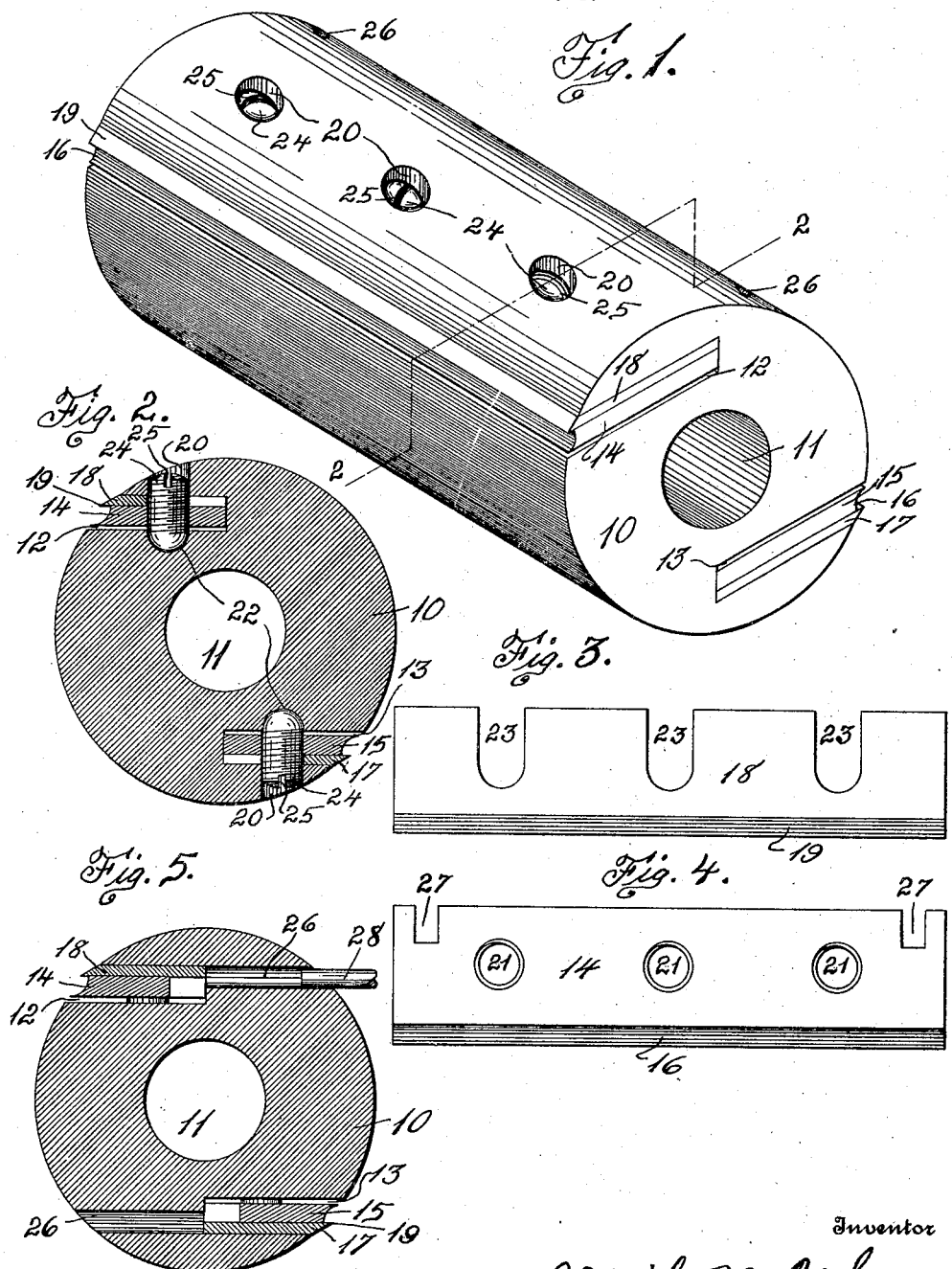
Inventor  
Virgil P. Whisler  
By Silasley Sweet  
Attorney Patented Mar. 15, 1927.

1,620,847

UNITED STATES PATENT OFFICE.

VIRGIL P. WHISLER, OF OTTUMWA, IOWA.

JOINTER HEAD.

Application filed June 30, 1926. Serial No. 119,734.

An object of this invention is to provide improved means for mounting a cutting blade or knife removably and replaceably in a jointer head.

A further object of this invention is to provide improved means for mounting a plurality of cutting blades or knives removably and replaceably in a jointer head.

A further object of this invention is to provide improved means for mounting a plurality of cutting blades or knives in a cylindrical jointer head, together with improved means for adjusting the projection of said blades relative to the periphery of said head.

My invention consists in the construction, arrangement and combination of elements hereinafter set forth, pointed out in the claims and illustrated by the accompanying drawing in which—

Figure 1 is a perspective of a cylindrical jointer head with two blades mounted therein and embodying my improvements. Figure 2 is a cross section of the device on the indicated line 2—2 of Figure 1. Figure 3 is a plan of one of the cutting blades. Figure 4 is a plan of a clamping member employed in the device. Figure 5 is a cross section of the jointer head showing improved means for adjusting the projection of a cutting blade relative thereto.

In the construction of the device as shown the numeral 10 designates a cylindrical jointer head provided with a longitudinal bore 11 by means of which said jointer head may be mounted on a mandrel or shaft (not shown) for use. Tangential grooves or slots 12, 13 are formed in and longitudinally of the head 10, on opposite sides of the bore 11 and opening through the periphery of said head. Clamping plates 14, 15 are mounted loosely in the slots or grooves 12, 13.

The clamping plates 14, 15 are formed with concaved outer margins 16 and do not project at any time beyond the periphery of the head 10. Cutting blades 17, 18 are mounted in the grooves or slots 12, 13 in contact with the radially-outer sides of the clamping plates 14, 15 and said blades are formed with cutting edges 19 on their outer margins projecting through the periphery of the jointer head. Registering holes 20, 21 are formed in the jointer head 10 and clamping plates 14, 15 and intersect the grooves or slots 12, 13. The holes 21 in the clamping plates are internally threaded or tapped and sphere shaped seats 22 are formed in jointer head on the opposite side of the slots from and in registration with the holes 20. The holes 20 and seats 22 are spaced apart throughout the length of the jointer head and the holes 21 are similarly spaced apart throughout the length of the clamping plates. Notches 23 are formed in and open through the inner margins of the cutting blades 17, 18 and register with the holes 20, 21 and seats 22. Headless screws 24 are mounted through the holes 20 and 21 and extend within the seats 22. Each screw 24 is formed with a sphere shaped outer end having a kerf 25 therein and is also formed with a sphere shaped inner end engaging and bearing within a seat 22. Each screw 24 is threaded to be screwed into a tapped hole 21 and is of such length that when it extends through a notch 23, hole 21 and to the bottom of a seat 22 the outer end thereof will substantially fill a hole 20, without projection, through the periphery of the jointer head and also without leaving room for the accidental insertion of a finger in said hole when the jointer head is in motion. When the screws 24 are seated they react on the seats 22 and force the clamping plates 14, 15 radially outward and cause said plates to engage and clamp the cutting blades 17, 18 rigidly against the radially outer walls of the grooves or slots 12, 13. Sometimes it is desirable to adjust the projection of the blades 17, 18 tangentially of the periphery of the jointer head, and to that end tangential holes 26 are formed in the jointer head in alignment with the transverse plane of and intersecting the grooves or slots 12, 13. Notches 27 are formed in the inner portions of the clamping plates 14, 15 and register with the holes 26. A suitable tool, such as a punch 28, may be driven inwardly of the holes 26 and engage the inner margin of one or the other of the cutting blades 17, 18 and move said blade outwardly, the inner end of the punch entering notch 27 freely and not disturbing the location of or contacting with the adjacent clamping plate. Thus, provision is made for adjusting the projection of the cutting edges 19 after the cutting blades have been partially tightened in their seats and preliminary to complete locking thereof by further setting of the screws 24. This improvement is employed in the usual manner by rotation at high speed relative to a portion of wood passed over it on a divided table, as is common and well known.

I claim as my invention—

1. A jointer head, comprising a cylindrical member adapted to be mounted for rotation and formed with tangential slots opening through the periphery thereof, clamping plates and cutting blades mounted substantially parallel with each other in said slots, the cutting blades being provided with cutting edges projecting through the periphery of the head, said head being formed with registering holes and seats, the planes of which intersect said slots, said clamping plates and cutting blades being formed with openings registering with said holes and seats, the openings in the clamping plates being tapped, and screws mounted in said holes and extending through said openings into engagement with said seats.

2. In a machine of the character described, a support, having slots opening to the surface thereof and formed with registering holes and seats, the planes of which intersect said slots, clamping plates mounted in said slots and formed with tapped holes registering with the holes and seats in the support, cutting blades mounted in said slots and formed with notches registering with said holes and seats, and screws mounted in said holes of the support, extending through the notches in the cutting blades, screwed through the holes in the clamping blades and engaging in said seats, said screws being adapted to react on said seats to cause the clamping plates to engage and clamp the cutting blades against the outer walls of said slots.

3. In a machine of the character described, a support, having slots opening to the surface thereof and formed with registering holes and seats, the planes of which intersect said slots, clamping plates mounted in said slots and formed with tapped holes registering with the holes and seats in the support, cutting blades mounted in said slots and formed with notches registering with said holes and seats, and screws mounted in said holes of the support, extending through the notches in the cutting blades, screwed through the holes in the clamping blades and engaging in said seats, said screws being adapted to react on said seats to cause the clamping plates to engage and clamp the cutting blades against the outer walls of said slots, the outer ends of said screws being adapted substantially to fill the holes in the support.

4. A jointer head, comprising a cylindrical member adapted to be mounted for rotation and formed with tangential slots opening through the periphery thereof, clamping plates and cutting blades mounted substantially parallel with each other in said slots, the cutting blades being provided with cutting edges projecting through the periphery of the head, said head being formed with registering holes and seats, the planes of which intersect said slots, said clamping plates and cutting blades being formed with openings registering with said holes and seats, the openings in the clamping plates being tapped, and screws mounted in said holes and extending through said openings into engagement with said seats. The jointer head also being formed with tangential holes in transverse alignment and intersecting said slots, the clamping plates also being formed with notches in their inner margins, whereby a punch may be introduced through the latter holes and engage the cutting blades without material contact with the clamping plates.

5. In a machine of the character described, a jointer head formed with a slot and also formed with a hole on one side and sphere shaped seat on the other side of said slot, a clamping plate and a cutting blade being mounted in said slot and formed with openings registering with said hole and seat, the opening in the clamping plate being tapped, and a screw mounted through the hole in the head and the opening in the cutting blade, screwed through the opening in the clamping plate and engaging in said seat, said screw being formed with a sphere shaped end for engagement with said seat and also formed with a sphere shaped outer end portion having a kerf and adapted substantially to fill said hole in the head.

Signed at Ottumwa, in the county of Wapello and State of Iowa, this 4th day of June, 1925.

VIRGIL P. WHISLER.